United States Patent

Dattilo

[15] 3,647,225

[45] Mar. 7, 1972

[54] LOW-FRICTION GUIDE FOR CARTRIDGE TAPE PLAYER

[72] Inventor: Donald J. Dattilo, Mt. Prospect, Ill.

[73] Assignee: Motorola, Inc., Franklin Park, Ill.

[22] Filed: Feb. 2, 1970

[21] Appl. No.: 7,917

[52] U.S. Cl. ....................274/4 R

[51] Int. Cl. ....................G11b 5/00

[58] Field of Search..........308/3 A; 312/341 R, 341 NR; 274/4 A, 4 B, 4 C, 4 F, 11 A, 11 B, 11 C, 11 F

[56] References Cited

UNITED STATES PATENTS

| | | | |
|---|---|---|---|
| 3,478,973 | 11/1969 | Lear et al. | 274/11 B |
| 2,653,852 | 9/1953 | Bissman | 312/341 NR |
| 1,751,899 | 3/1930 | Whitfield | 312/341 NR |
| 2,759,773 | 8/1956 | Wilmer et al | 312/341 R |
| 2,815,252 | 12/1957 | Baker | 312/341 NR |

FOREIGN PATENTS OR APPLICATIONS

| | | | |
|---|---|---|---|
| 816,050 | 7/1959 | Great Britain | 308/3 A |

*Primary Examiner*—Harry N. Haroian
*Attorney*—Mueller, Aichele & Rauner

[57] ABSTRACT

A cartridge-type magnetic tape player is provided with a snap-in guide member which is removably fastened to one of the sidewalls of the entryway of the tape player so that when a cartridge is inserted into the entryway and moved therealong the guide member will provide a low-friction guide surface for the cartridge.

7 Claims, 5 Drawing Figures

PATENTED MAR 7 1972 3,647,225

Inventor
DONALD J. DATTILO
BY
Mueller, Aichele & Rauner
ATTYS.

LOW-FRICTION GUIDE FOR CARTRIDGE TAPE PLAYER

BACKGROUND OF THE INVENTION

This invention relates generally to magnetic tape players, and more particularly to magnetic tape players of the type which receive multitrack tape cartridges which are inserted and removed from an entryway of the recorder. Specifically, this invention is directed to a novel guide member of unitary construction which provides a low-friction guide surface for cartridges being inserted and removed from the tape player.

Heretofore, cartridge-type tape players, which are well known in the art, have been provided with various means for guiding a cartridge through the entryway as it is inserted and removed therefrom. For example, one approach is to provide a pair of spaced-apart confronting walls of the same metal which composes the player housing, and these walls are dimensioned so that their transversed distance is only slightly greater than the distance across the width of a tape cartridge. By so providing the close tolerance of dimension, the walls act as guide members for the tape cartridge. However, in so providing metal walls along which the tape cartridge rides, excessive wear is experienced on the sidewalls of the cartridge which is generally made of plastic or the like. Also, this method of guiding a tape cartridge requires that the spaced-apart confronting walls be accurately dimensioned apart, a requirement which may be difficult to achieve by parts made of metal stampings. Also, metal sidewalls which are spaced apart a dimension to engage the sidewalls of the tape cartridge offer a relatively high coefficient of friction therebetween, thus requiring more force to lock in and unlock the tape cartridge to a fully locked in position.

Another method of providing a guide for a tape cartridge as it moves into and out of the entryway of a tape player is to provide one or more guide rollers mounted to a guide wall in such a fashion so that the axis of rotation of the guide roller is parallel to the corresponding sidewall of the cartridge which passes along the roller and which axis is transverse to the direction of movement of the cartridge. Such guide rollers, while being efficient in operation, are relatively expensive to manufacture and complicated to assemble as they require many parts, and should replacement be required of these rollers, it is a difficult task, to say the least, requiring the tape player to be sent back to the manufacturer, in most cases, for such replacement.

SUMMARY OF THE INVENTION

Accordingly, it is among the objects of this invention to provide a guide member of unitary construction which is inexpensive to manufacture, readily installed within the entryway of a tape player without the use of special tools and in a minimum of time, and which is efficient and reliable in operation.

Briefly, a magnetic tape player is provided with an entryway which received a tape cartridge containing a quantity of magnetic tape. The front end portion of the cartridge is provided with an opening which receives the magnetic transducer head of the tape player to cause the audio signal information on the tape to be reproduced in a conventional and well-known manner. A pair of spaced-apart confronting walls define the transverse extent of the entryway and the tape cartridge moves between these walls as it is inserted and removed. Most advantageously, one of the sidewalls is provided with a guide member of unitary construction which is secured thereto by tabs, or the like, formed on the guide member. These tabs engage terminal edges which define one or more apertures to lock the guide member in place. While a cartridge moves through the entryway upon insertion or removal thereof, it may engage the guide member to slide therealong during its entire length of travel or only during a fractional portion of its length of travel. Holding means are provided to engage the cartridge upon insertion thereof into the entryway and hold the cartridge in a secure but removable condition. The guide member secured to one of the sidewalls of the entryway is readily removable therefrom and can be replaced, if necessary, with a minimum of time and effort.

DESCRIPTION OF THE PREFERRED EMBODIMENT

Figures 1, 2, 3, 4, 5:
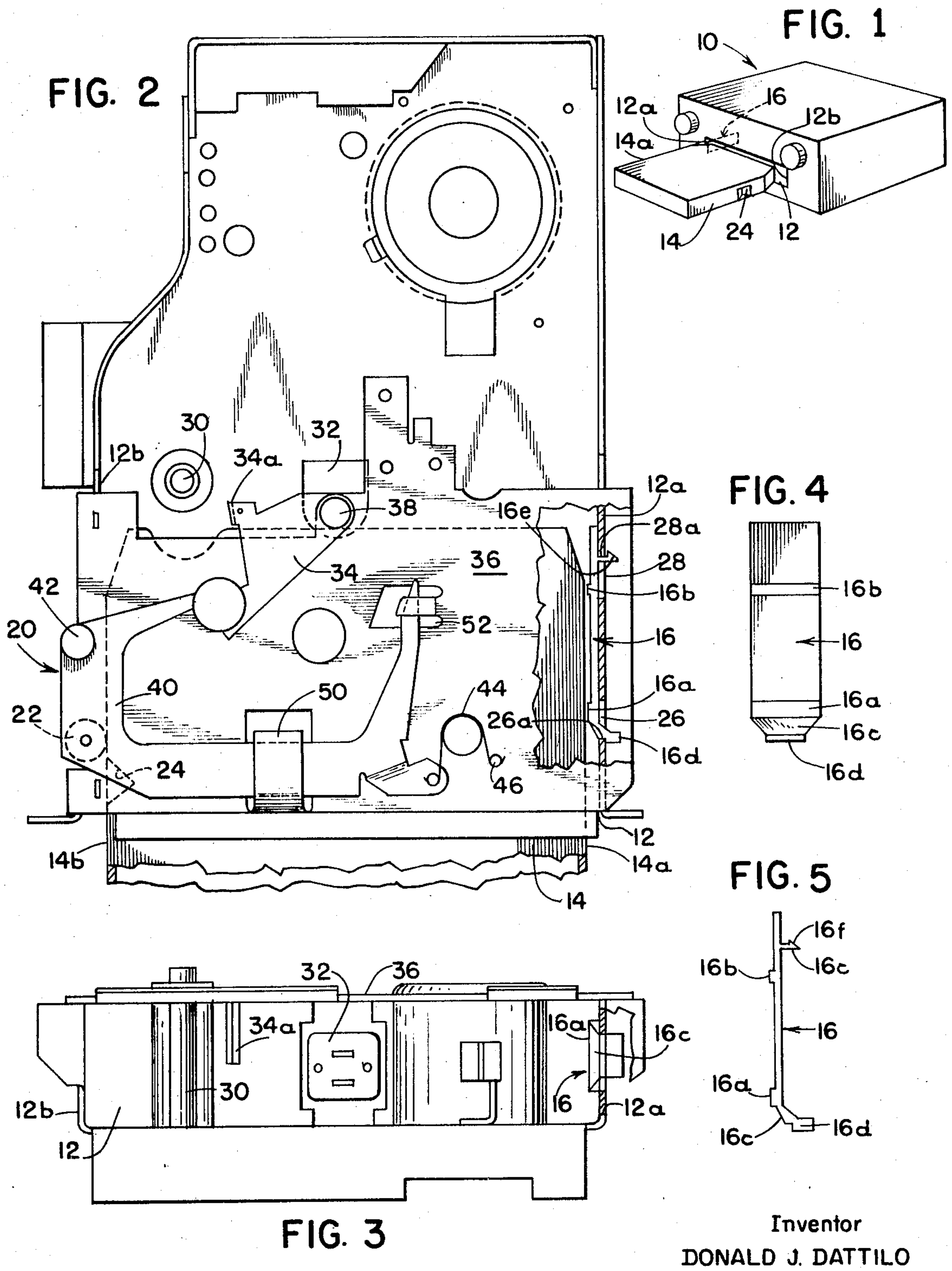
FIG. 1 is a prospective view of a cartridge-type tape player wherein the low-friction guide member of the invention is secured to a sidewall which forms a part of the entryway thereof.
FIG. 2 is a bottom view of the tape player of FIG. 1 illustrating the details of the housing and the guide member fastened to one sidewall thereof.
FIG. 3 is a front view of the housing shown in the FIG. 2.
FIG. 4 is a side view of the guide member of this invention.
FIG. 5 is an edge view of the guide member of FIG. 4.

Referring now to FIG. 1 there is seen a prospective view of a cartridge-type tape player which is designated generally by reference numeral 10. The tape player 10 has formed therein an entryway 12 into which is readily inserted a tape cartridge 14 which contains a quantity of magnetic tape. The magnetic tape in the cartridge 14 may have audio signal information thereon to be reproduced by the tape player 10 in a conventional and well-known manner. The entryway 12 is formed of top and bottom confronting walls together with a pair of horizontally spaced-apart vertical walls which define the transverse extent of the entryway 12. For example, a sidewall **12*a* and a sidewall 12*b* determine the transverse extent, or width, of the entryway 12, preferably this width being only slightly greater than the width of the tape cartridge 14**.

Most advantageously, a guide member 16 of unitary construction is fastened to the sidewall **12*a* to provide a low-friction surface to engage with the corresponding sidewall 14*a* of the tape cartridge 14. As the cartridge 14 is inserted into the entryway 12, it eventually comes in contact with the guide member 16, if not at once, then at the time the cartridge 14 is locked in position. During the time when contact of the sidewall 14*a* is made with the guide member 16, minimum wear of the sidewall 14*a*** is experienced.

For a better understanding of the guide member 16, reference is now made to FIGS. 2 and 3 which illustrate the guide member 16 in its locked-in position on the sidewall **12*a* and to FIGS. 4 and 5 which illustrate the details of the guide member. In FIG. 2 it is clearly seen that the sidewall 14*a* of the cartridge 14 engages with the guide member 16, preferably at a pair of spaced-apart contact areas defined by rib portions 16*a* and 16*b*. The cartridge 14, if not engaged with the contact areas 16*a* and 16*b* during its travel through the entryway 12, is forced against these contact areas when the cartridge 14 is finally locked home by a cartridge locking and ejecting mechanism designated generally by reference numeral 20. The locking mechanism 20 includes a roller 22 which is spring biased into a notch 24 formed in the cartridge 14 in a manner well known in the art. The locking and ejecting mechanism 20** preferably is of the type disclosed in U.S. Pat. No. 3,485,500 issued on Dec. 23, 1969 and assigned to the same assignee as this application.

Most advantageously, the guide member 16 is readily inserted into apertures 26 and 28 which define terminal edge portions **26*a* and 28*a*, respectively, to engage with portions of transversely extending tabs 16*d* and 16*e* of the guide member 16. Although a pair of apertures 26 and 28 are shown in the sidewall 12*a*, it will be understood that a single-elongated aperture may be provided as well as a pair of smaller apertures, or any other suitable means as desired to retain the guide member 16. To insure that the cartridge 14 will move smoothily through the entryway 12 as it is inserted therein, the guide member 16 is provided with a slated forward portion 16*c* which guides the tape cartridge 14** to the proper transverse position without causing the tape cartridge to hang-up or catch while it is being inserted.

As best seen in FIG. 5, the tab portion 16d is substantially rectangular in the cross section and is inserted into the aperture 26 to engage the terminal edge portion **26*a* thereof. On the other hand, the tab 16*e*** is provided with a slanted surface 16*f* extending rearwardly thereof to engage with the terminal edge portion 28*a* of the aperture 28 to facilitate snapping in the guide member 16 upon installation thereof. That is, the novel guide member of this invention is readily fastened to the sidewall 12*a* by merely first placing the tab portion 16*b* into the aperture 26 to urge the guide member against the terminal edge portion 26*a*, and then smartly pressing the rear portion of the guide member 16 so that the slanted surface 16*f* of the tab member 16*e* will ride over the terminal edge portion 28*a*. This will cause the hook portion of each of the tabs 16*d* and 16*e* to extend beyond the terminal edge portion 26*a* and 28*a*, respectively, thereby locking the guide members 16 in position. However, should removal of the guide member 16 be necessary, the tab member 16*e* is readily manually flexed toward the tab member 16*d* so that the hook portion of the tab member 16*e* will clear the terminal edge portion 28*a* and allow the guide member to be pushed away from the wall 12*a* and removed therefrom.

Once the tape cartridge 14 is in position, it is securely held by the locking and ejection mechanism 20 and a capstan shaft 30 engages the tape and drive pulley, not shown, in the cartridge 14 to transport the tape within the cartridge past a magnetic pick up head 32. The locking and ejection mechanism 20 includes a first arm or bell crank 34 which is pivotally mounted to a bottom plate 36 which forms the bottom wall of the entryway 12. The bell crank 34 is pivotal about a rivot 38 and moves about the axis of the rivot 38 when the cartridge 14 engages a depending member 34a formed on the bell crank 34. The locking and ejection mechanism 20 further includes a second arm member 40 which is pivotally mounted to the top plate 36 by a rivot 42. An overcenter spring 44 has one end connected to the arm 40 and the other end connected to a small spring post 46 extending from the bottom plate 36. The overcenter spring 44 is used to bias the linkage formed by the arms 34 and 40 into first and second stable positions. The first stable position is obtained when no cartridge is inserted into the entryway 12 and the linkage is in the position as shown in FIG. 2. The other stable position, not shown, is when the tape cartridge 14 is inserted in the fully locked condition whereby the locking wheel 22 engages the notch 24 on the cartridge 14, as is well known in the art. The arm 40 has portions thereof received by a tab like member 50 and a tab like member 52, each of which is struck out of the bottom plate 36 and bent slightly therefrom to provide a guide for the arm 40 within its limited distance of travel.

As the locking and ejection mechanism 20 disclosed herein forms no part of this invention, it is deemed unnecessary to describe in any further detail and reference to U.S. Pat. No. 3,485,500 can be had for further information on the mechanism 20.

This invention has clearly illustrated and disclosed a novel guide member of inexpensive unitary construction which is readily inserted into a sidewall of the entryway 12 of a cartridge-type tape player and readily removed therefrom for replacement without the use of special tools, or the like. Accordingly, it will be understood that variations and modifications of this invention may be effected without departing from the spirit and the scope defined within the appended claims.

1. A magnetic tape player having a magnetic transducer head for engagement with a magnetic tape which is transported past the head, and an entryway for receiving a cartridge which contains the magnetic tape, comprising in combination:

a pair of spaced-apart confronting walls forming a portion of said entryway to limit transverse movement of a cartridge being inserted therein, one of said walls having aperture means formed therein;

holding means for firmly, but removably holding the cartridge in a fully inserted position to cause the magnetic tape within the cartridge to engage with said head; and a guide member of unitary construction having a pair of ribs formed thereon which extend in a direction transverse to the movement of the cartridge as it is inserted into the entryway to provide limited contact areas which are spaced apart one from the other on a said guide member, said guide member further including a tab portion which extends transversely through said aperture means firmly to hold said guide member in a locked position on said one wall so that said ribs extend into the space forming the entryway to slideably engage with a corresponding sidewall surface of the cartridge as it is inserted into the entryway.

2. The magnetic tape player of claim 1 wherein said tab portions extending through the sidewall has a slanted surface on the side thereof engaging the associated terminal edge of said aperture means to facilitate snapping in the guide member in position on the said one of said pair of sidewalls.

3. The magnetic tape player of claim 1 wherein the said guide member has a front portion thereof extending toward the opening of the entryway, which front portion is slanted so as to allow a tape cartridge being inserted into the entryway to engage with the front portion and ride therealong a short distance to then engage said ribs of said guide member which guides and aligns the cartridge transversely within the entryway.

4. The magnetic tape player of claim 1 wherein the said guide member is rectangular in configuration having its longitudinal dimension extending along the said one of said pair of sidewalls a distance greater than one-half the axial distance of the entryway, said tab portions formed on the ends of said guide member and spaced apart along the longitudinal dimension thereof, said tab portions extending through aperture means formed in said one wall to engage terminal edges of the aperture means to lock the guide member in position.

5. The magnetic tape recorder of claim 4 wherein one of said tab members has a slanted end surface to slide along the corresponding terminal edge engaging the same to facilitate snapping the guide member in a locked position to the one of said pair of sidewalls.

6. A magnetic tape player having a magnetic transducer head for engagement with a magnetic tape which is transported past the head, and an entryway for receiving a cartridge which contains the magnetic tape, comprising in combination: a pair of spaced-apart confronting walls forming a portion of said entryway to limit transverse movement of a cartridge being inserted therein, one of said sidewalls having aperture means formed therein; holding means for firmly, but removably holding the cartridge in a fully inserted position to cause the magnetic tape within the cartridge to engage with said head; and a guide member of unitary construction having means to secure the same within the aperture means of said one wall and including a slide portion engaged by the cartridge upon insertion into said entryway, said slide portion including rib means engaged by the cartridge upon insertion into said entryway, said rib means extending transverse to the direction of travel of the cartridge as it is inserted into said entryway to provide limited spaced apart contact areas.

7. The magnetic tape player of claim 6 wherein said slide portion of said guide member includes a slanted front portion to allow a tape cartridge being inserted into said entryway to engage with said front portion and ride therealong a short distance to then engage said rib means which guides and aligns the tape cartridge transversely within said entryway.

* * * * *